United States Patent [19]

Iwaoka et al.

[11] Patent Number: 4,768,847
[45] Date of Patent: Sep. 6, 1988

[54] HOLOGRAM SCANNER

[75] Inventors: Hideto Iwaoka; Takahiro Shiozawa, both of Tokyo, Japan

[73] Assignee: Yokogawa Electric Corporation, Tokyo, Japan

[21] Appl. No.: 633,713

[22] Filed: Jul. 23, 1984

[30] Foreign Application Priority Data

Aug. 18, 1983 [JP] Japan .................................. 58-150755

[51] Int. Cl.⁴ ................................................ G02B 5/32
[52] U.S. Cl. ................................................... 350/3.71
[58] Field of Search ......................................... 350/3.71

[56] References Cited

U.S. PATENT DOCUMENTS 4,239,326  12/1980  Kramer ............................... 350/3.71

FOREIGN PATENT DOCUMENTS 0041845  12/1981  European Pat. Off. ............ 350/3.71
0047019   4/1981  Japan .................................. 350/3.71
0032167   4/1981  Japan .................................. 350/3.71
0030815   2/1982  Japan .................................. 350/3.71

OTHER PUBLICATIONS

Lin, L. H. et al., "Efficient and Aberration-Free Wavefront Reconstruction From Holograms Illuminated at Wavelengths Differing From the Forming Wavelength", *Applied Optics*, vol. 10, No. 6, Jun. 1971, pp. 1314–1318.

Primary Examiner—Bruce Y. Arnold
Attorney, Agent, or Firm—Moonray Kojima

[57] ABSTRACT

An optical scanning device comprising a transmission or reflection hologram disk, wherein recording beams, such as an object and a reference beam which are used in preparing holograms, and a reconstructing beam which is used in reconstructing or scanning, are spherical waves having different wavelengths; and wherein the sources of recording beams and reconstructing beams are located at different positions for enabling the beams to fall obliquely on the hologram disk to cause a reconstructed image on a focusing or scanning plane to be subjected to linear aberration free scanning. The incident angle of the reconstructing beam on the hologram disk meets the Bragg condition for high diffraction efficiency.

3 Claims, 7 Drawing Sheets

HOLOGRAM SCANNER

BACKGROUND OF THE INVENTION

1. Field of Invention

This invention relates to an optical scanning device or hologram scanner comprising holograms for deflecting an optical beam at high speeds, and more particularly to an optical scanning device capable of linear aberration free scanning for effective use in an apparatus for recording and displaying signals or images using optical signals.

2. Description of Prior Art

FIG. 1 of the drawings illustrates a conventional optical scanning device using holograms. The optical scanning device, or hologram scanner, comprises a hologram disk 3 composed of holograms 31,32,33, ... etc, prepared by exposure to an object beam 1 emitted as a divergent beam from a point source and a reference beam 2 emitted as parallel rays. Beams 1,2 are indicated by dotted lines. When parallel beams fall on the holograms 31,32,33, etc, an image is reconstructed by a reconstructing beam 5 impinging on a focusing plane 4 which is scanned and which is disposed behind hologram disk 3, as depicted.

As hologram disk 3 rotates, the reconstructed image on focusing plane 4 moves thereon along an arcuate scanning line as shown, with the result that the image is distorted. Although optical scanning devices employing semiconductor lasers are highly effective for use in laser printers, no hologram photosensitive material is available which has a sensitivity at the wavelength (0.78 μm, for example) of the semiconductor laser. Therefore, there has been no optical scanning devices using holograms for semiconductor lasers.

SUMMARY OF THE INVENTION

Accordingly, an object of the invention is to overcome the aforementioned and other deficiencies of the prior art.

A further object is to provide an optical scanning device comprising holograms which are capable of being linearly scanned with a reconstructing beam (such as, for example, a semiconductor laser beam) having a wavelength which is different from that of the recording beam (such as, for example, comprising a reference beam and an object beam) used in preparing the holograms and also which are capable of producing aberration free convergence or lens action.

According to the invention, there is provided an optical scanning device comprising a transmission or reflection hologram disk, wherein recording beams (which comprise an object beam and a reference beam) used in preparing holograms and a reconstructing beam used in reconstruction are of diverging or converging spherical waves having different wavelengths. The optical scanning device comprises beam sources (which generate the recording and reconstructing beams) located at different positions for enabling the beams to fall obliquely on the hologram disk to cause a reconstructed image on a focusing plane to be subjected to linear aberration free scanning.

DESCRIPTION OF THE PREFERRED EMBODIMENT

Figure 1:
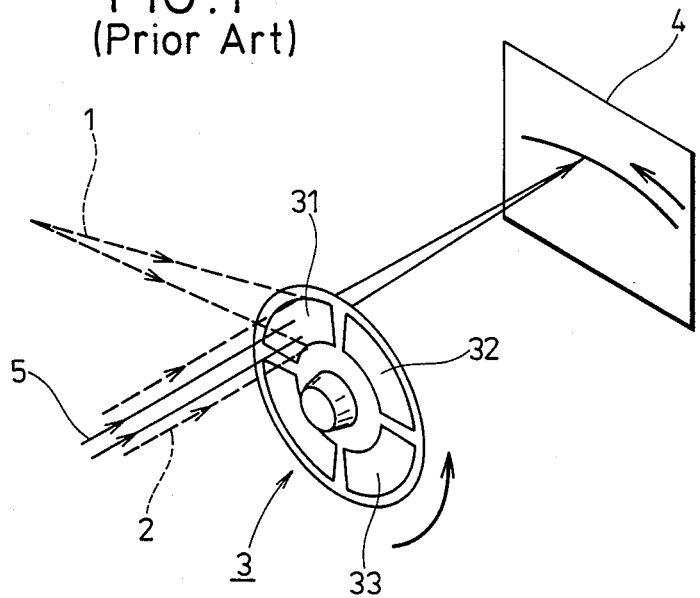
FIG. 1 is a schematic perspective view depicting a conventional optical scanning device comprising holograms.
Figure 2:
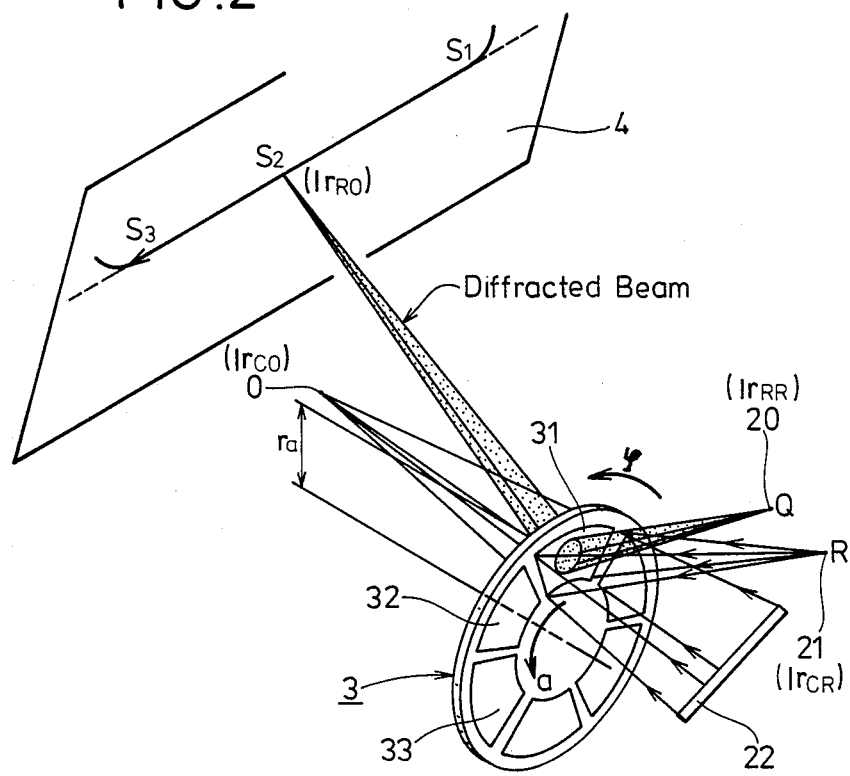
FIG. 2 is a schematic perspective view depicting an illustrative embodiment of the invention.
Figure 3:
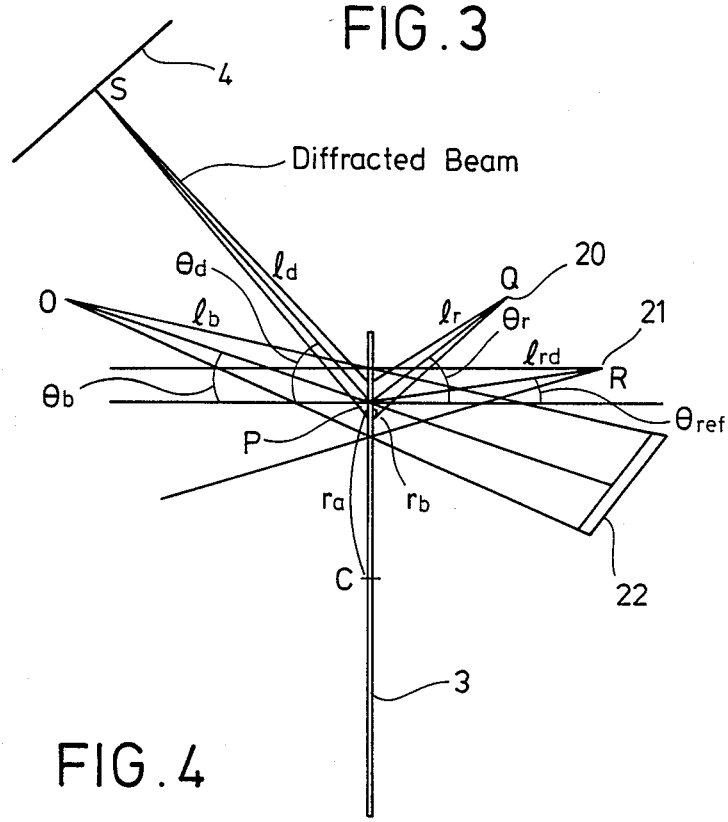
FIG. 3 is a side elevational view of the embodiment of FIG. 2.

Turning now to FIG. 2, there is shown, in perspective, an illustrative optical scanning device in both the recording mode (or hologram formation) and the reconstruction mode (or scanning). FIG. 3 is a side elevational view of a hologram disk of the optical scanning device. In these figures, a hologram disk, generally designated 3, comprises a plurality of holograms 31,32, 33, ... etc, comprising plates coated with a hologram photosensitive material and arranged circumferentially in the direction of rotation (indicated by arrow a) of hologram disk 3. Each of the holograms 31,32,33, etc, effects one stroke of scanning. The illustrated hologram disk 3 may comprise a transmission hologram disk or a reflection hologram disk, the illustrated one being a transmission hologram disk. Positioned behind disk 3 is a focusing plane 4.

An object beam source 22, used when forming the holograms, emits a convergent spherical wave which converges at a point 0. A reference beam source 21 emits a divergent spherical wave having the same wavelength ($\lambda_C = 0.62$ μm, for example) as that of the object beam and has its point source at a point R. Object beam source 22 and reference beam source 21 are disposed so that the beams emitted therefrom will fall obliquely on the holograms 31,32,33, etc., that is, at an incident angle other than 0° at a scanning central position. The beams from sources 21,22 serve to record interference fringes on holograms 31, 32, 33, etc. In other cases, the object beam may be divergent spherical waves and the reference beam may be convergent spherical waves.

A reconstructing beam source 20, used for reconstructing (or scanning) the recorded images, emits a divergent spherical wave having a wavelength ($\lambda_R = 0.78$ μm, for example, of a semiconductor laser) different from that of the reference beam. Reconstructing beam source 20 has its point source at a point Q spaced suitably from reference point source R. The beam emitted from reconstructing beam source 20 falls obliquely on hologram disk 3 at an angle other than 0° at the scanning central position. The reconstructing beam is then diffracted at a high diffraction efficiency by the interference fringes recorded on holograms 31, 32, 33, etc. As hologram disk 3 rotates (i.e. moves), the diffracted beam scans focusing plane 4 with a small beam spot from S1 to S2 to S3 along a straight line in an aberration free manner. In other cases, the reconstruction beam may be a convergent spherical wave.

According to the invention, reference beam source 21, reconstruction beam source 20 and object beam source 22 are positioned so as to meet equations (1), (2), set forth below, for linear aberration free scanning. The incident angle of the reconstruction beam, as it falls on the holograms, is selected to be equal or close to the Bragg incident angle. That is to say, the high diffraction efficiency is achieved by meeting the Bragg condition given by equation (3).

$$f_C(\pi r_{CO}, \pi r_{CR}, r, \theta, \rho, \lambda_C) \approx f_R(\pi r_{RO}, \pi r_{RR}, r, \theta, \rho, \lambda_R) \quad (1)$$

$$\phi_C(\pi r_{CO}, \pi r_{CR}, r, \theta, \rho, \lambda_C) \approx \phi_R(\pi r_{RO}, \pi r_{RR}, r, \theta, \rho, \lambda_R) \quad (2)$$

$$\theta_r = \sin^{-1}\left(\frac{\lambda_R}{2d'}\right) - \frac{\theta_{ob} - \theta_{ref}}{2} \quad (3)$$

wherein
- $f_C$ = spatial frequency of the interference fringes recorded on the holograms by the object beam and reference beam.
- $\Phi_C$ = inclination of the interference fringes formed by the object and reference beams.
- $f_R$ = spatial frequency of hypothetical interference fringes formed on the holograms by a hypothetical beam converging at one point on the focusing plane and the reconstructing beam.
- $\Phi_R$ = inclination of the hypothetical interference fringes.
- $\pi r_{CO}$ = vector indicative of the position of the object beam source.
- $\pi r_{CR}$ = vector indicative of the position of the reference beam source.
- $\pi r_{RO}$ = vector indicative of the position of the hypothetical beam source.
- $\pi r_{RR}$ = vector indicative of the position of the reconstructing beam source.
- $(r, \theta)$ = coordinates on the hologram disk.
- $\phi$ = angle of rotation of the hologram disk.
- $\lambda_C$ = wavelength of the recording beams (reference beam and object beam).
- $\lambda_R$ = wavelength of the reconstructing and hypothetical beams.
- $\theta_r$ = incident angle of the reconstructing beam.
- $\theta_{ob}$ = incident angle of the object beam.
- $\theta_{ref}$ = incident angle of the reference beam.
- $d'$ = three dimensional pitch of the interference fringes on the hologram disk.

Turning again to FIG. 3, shown in distance $r_a$ between center C of rotation of hologram disk 3 and center P of each of holograms 31, 32, 33, etc, and distance $l_d$ from point P to focusing plane 4 (scanning position). With the foregoing distances, the positions of the object beam source, the reference beam source and the reconstructing beam source, are determined from equations (1), (2) and (3) so that the incident angle of the reconstructing beam meets the Bragg condition and the linearity and convergence are optimal with respect to the interference fringe formed at point P by action of the object beam and reference beam. Since it is difficult to solve equations (1) and (2) analytically, it is preferable to solve the equations as extremal problems of numerical analysis using a computer or the like.

Since reconstructing beam source 20, used upon reconstruction or scanning, is positioned at a location different from that of reference beam source 21, and since the reconstructing beam and reference beam have different wavelengths and are spherical waves falling obliquely on the holograms, and since the hologram 3 rotates and moves, a reconstructed image produced on focusing plane 4 by the diffracted beam from the holograms may be, advantageously, linearly scanned in an aberration free manner, by selecting positions of the beam sources so that equations (1) and (2) are met.

More specifically, divergent spherical waves are used as the reference beam and as the reconstruction beam and the incident angle of the beam on the hologram disk is selected to be other than 0° at the scanning central position. As the hologram disk is rotated, the different incident angles of the reference beam and of the reconstructing beam are relatively varied, and the diffraction angle of the diffracted beam is varied utilizing the angle difference. An angle $\theta_d$ (see FIG. 3) formed by projecting the axis of the diffracted beam on a plane (y-z plane in FIG. 4) containing P, Q, R, and viewed from the side of disk 3, is kept constant all the time, irrespective of rotation of hologram 3, thereby linearly scanning the reconstructed image on focusing plane 4.

Aberration free scanning will be described with reference to FIG. 4. Freedom from aberration means that the beam spot formed on the focusing plane on the diffracted beam has a diameter equal to or close to a diffraction limit below a target spot diameter.

Figure 4:
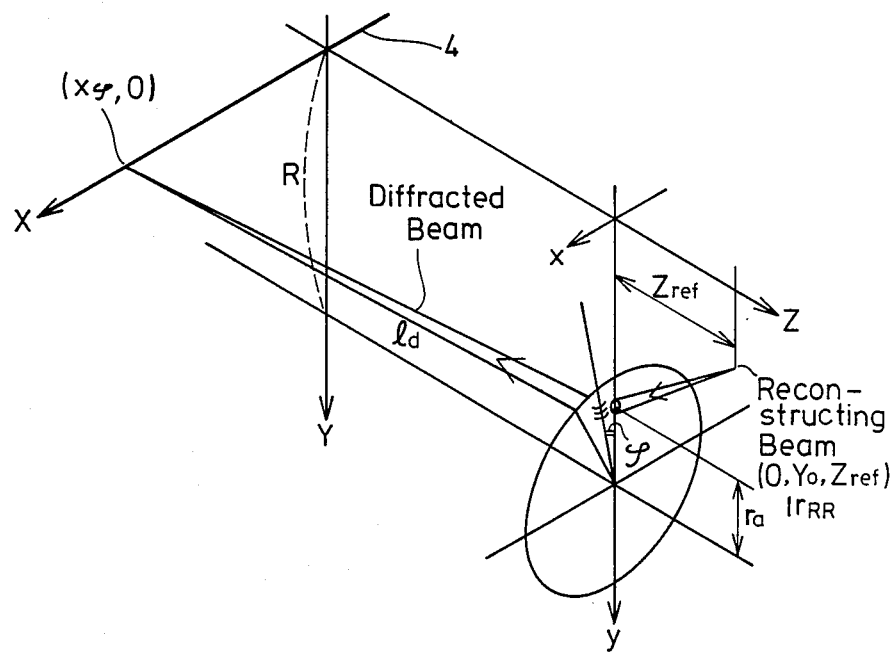
FIG. 4 is a diagram illustrating aberration free scanning.

As shown in FIG. 4, aberration free linear scanning is achieved if the interference fringes formed on the holograms by the hypothetical beam (i.e. ideal diffracted beam) converging at one point on focusing plane 4 and the reconstructing bem coincide with the interference fringes formed by action of the object beam and reference beam, at the time of recording or exposure. If the interference fringes coincide with each other, coincidence between spatial frequencies $f_C$, $f_R$ and between inclinations $\phi_C$, $\phi_R$ of the interference fringes can be regarded as the preferred condition. This expression remains the same if the interference fringes are represented by rates of change of the spatial frequencies dependent on the position, the curvature, or the like. The left and right sides of expressions (1) and (2) are not completely equal to each other, and hence the positions of the object beam source, reference beam source, and reconstructing beam source are determined by finding an approximately equal relationship within an allowable range of linear aberration free scanning.

One example of the calculation process will now be described. It is assumed that an x-y-z coordinate system is used, and the terms of the phases of field intensity distribution on the hologram surface at the time the position of the reference beam source is $(0, Y_r, Z_r)$ and the position of the converging point of the object beam is $(0, 0, Z_0)$ are given by the expressions (4) and (5).

$$\exp\{-ik\sqrt{x^2 + (y - y_r)^2 + z_r^2}\} \quad (4)$$

$$\exp\{ik\sqrt{x^2 + y^2 + z_0^2}\} \quad (5)$$

wherein k is a wave number.

The term of the phase of a beam intensity distribution of the interference fringes recorded on the hologram disk is given by expression (6).

$$\cos\{k(\sqrt{x^2 + y^2 + z_0^2} + \sqrt{x^2 + (y - y_r)^2 + z_r^2})\} \quad (6)$$

Spatial frequency $f_C$ of the interference fringes and inclination angle $\phi_C$ of the interference fringes are derived from the above expressions as follows $$f_C = (1/\lambda_C a \cdot b)\sqrt{\{y \cdot b + (y - y_r)a\}^2 + (a + b)^2 x^2} \quad (7)$$

$$\phi_C = \arctan\frac{y \cdot b + a(y - y_r)}{x(a + b)} - \rho \quad (8)$$

-continued wherein $$a = \sqrt{x^2 + y^2 + z_0^2}$$

$$x = r_a \sin\rho$$

$$b = \sqrt{x^2 + (y - y_r)^2 + z_r^2}$$

$$y = R - r_a \cos\rho$$

$R$, $r_a$ (measurements shown in FIGS. 2 and 4)

In FIG. 4, the relationship between the incident angle and diffraction angle of the beam diffracted by the interference fringes recorded on hologram disk 3 is as follows.

$$m' - m = p \cdot f_C \cdot \lambda \cos\phi_C \qquad (9)$$

$$n' - n = p \cdot f_C \cdot \lambda \sin\phi_C \qquad (10)$$

wherein m is the cosine of the direction of the incident beam with respect to the x-axis, n is the cosine of the direction of the cincident beam with resepct to the y-axis, n' and m' are the cosines of the diffracted beam with respect to the x-axis and y-axis, respectively, and p is the degree of the diffracted beam which is normally a first order diffracted beam.

If the relative positions of $\pi r_{CO}'$, $\pi r_{CR}'$, $\pi r_{RR}'$ and $r_a$ and the distribution of the reconstructing beam on disk 3 are determined, then, a spot diagram can be drawn on an appropriate scanning plane as disk 3 rotates. Based on this spot diagram, the respective positions of $\pi r_{CO}'$, $\pi r_{CR}'$, $\pi r_{RR}'$ and $r_a$ in which the linearity and convergence are optimum and the diffraction efficiency is high, can be determined by an iterative method.

More specifically, the following functions are determined:

Evaluation function $E_1$ regarding linearity, as indicated by equation (11).
Evaluation function $E_2$ regarding convergence, as indicated by equation (12).
Total evaluation E as indicated by equation (13). Also, the positions of $\pi r_{CO}'$, $\pi r_{CR}'$, $\pi r_{RR}'$, $\pi r_{RO}'$ and $r_a$ are found by an iterative method so that these evaluation functions will be mimimum.

$$E_1 = \left[ \sum_{pi} \{(1r_C(\rho))_y - (1r_C(\rho))_y\}^2 \right] / N_{pi} \qquad (11)$$

wherein $\phi_i = (i=1, 2, \ldots, N\phi_i)$ is a value when the angle of rotation of the hologram disk is appropriately sampled, $$\sum_{pi}$$

is the sum of $\phi_i$, $r(\phi)$ is a two dimensional vector on the scanning plane, indicating the position of the diffracted beam on the scanning plane, C in $r_C(\phi)$ is indicative of the diffracted beam from the center of the distribution of the reconstructing beam on the hologram disk, and $(\pi r_C(\phi))_y$ is a component of $\pi r(\phi)$ normal to the scanning direction, and $$(1r_C(\rho))_y = \sum_{pi} (1r_C(\rho))_y / N_{pi}$$

$$E_2 = \sum_{pi} \sigma_i^2 / N_{pi} \qquad (12)$$

$$\sigma_{pi2} = \sum_{pi} |1r_{pi}(\rho) - 1r_{pi}(\rho)|_2 / N_{pi}$$

$$1r_{pi}(\rho) = \sum_{pi} 1r_{pi}(\rho) / N_{pi}$$

wherein $pi(i=1, 2, \ldots, N_{pi})$ in $r_{pi}(\phi)$ represents the diffracted beam from one sampled point where the distribution of the reconstructing beam on the hologram disk is suitably sampled, and $$\sum_{pi}$$

is the sum of pi.

The total or overall evaluation function E for the combined linearity and convergence is given by equation (13).

$$E = \omega_1 E_1 + \omega_2 E_2 \qquad (13)$$

wherein $\omega_1$ and $\omega_2$ are weighing constants.

Figure 5:
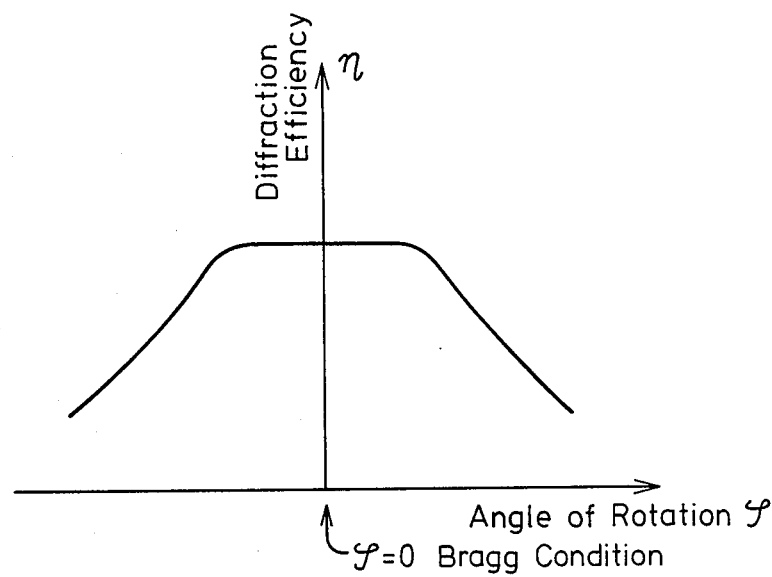
FIGS. 5 through 15 are diagrams depicting characteristic curves of the illustrating embodiment.
Figure 6:
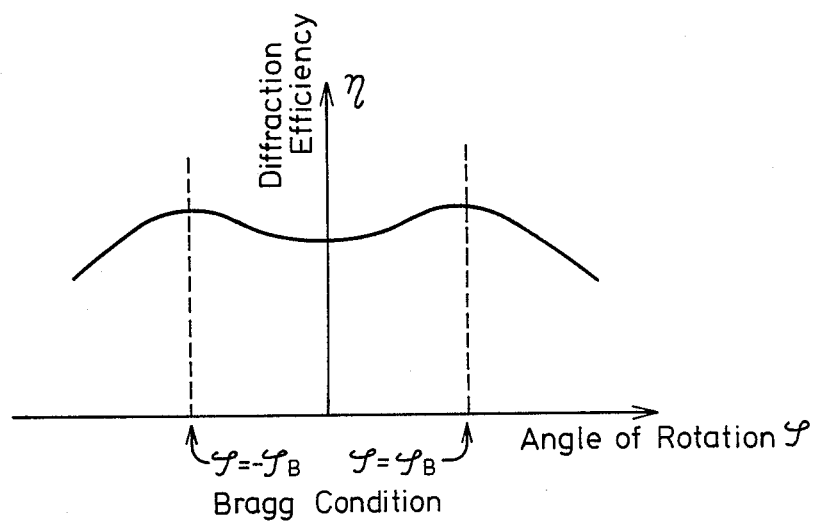

The manner in which the Bragg condition is specifically determined will now be described. If the Bragg condition of equation (13) is met, a three dimensional hologram can provide high diffraction efficiency. Therefore, when the angle of rotation of the hologram disk is $\phi = 0$, the angle at which the central ray of the reconstructing beam should meet the Bragg condition, the diffraction efficiency under this condition is as shown in FIG. 5 in which the diffraction efficiency is high, although it is lowered at marginal edges of the scanning field. Another method is to meet the Bragg condition at $\phi = \pm \phi_B$ ($\phi_B \neq 0$). The diffraction efficiency under such condition is as shown in FIG. 6, in which the characteristics are relatively flat.

One specific example of calculation is to use the following evaluation function (14) for the diffraction efficiency.

$$E_3 = \sum_{pi} \sum_{pi} \theta_B^2 \qquad (14)$$

wherein $\theta_B$ is a deviation angle of the reconstructing beam from the Bragg condition of the incident angle. Also, the following evaluation function (15) is used for the combined linearity, convergence and diffraction efficiency.

$$E = \omega_1 E_1 + \omega_2 E_2 + \omega_3 E_3 \qquad (15)$$

wherein $\omega_1$, $\omega_2$, $\omega_3$ are weighing constants.

Although the analysis and calculation have been made with respect to a two dimensional hologram, a three dimensional hologram is actually employed in many cases since it can achiev a high diffraction efficiency. The analysis of the three dimensional hologram is however complex, and generally sufficient results are obtained if analyzed with the two dimensional hologram.

The object beam source and the reference beam source are placed in positions which meet the factors $\pi_{CO}'$, $\pi_{CR}'$, $r_a$ thus determined, and images are recorded (i.e. exposed) on the hologram disk at a plurality of regions. The holograms are then developed, and if necessary bleached to increase the diffraction efficiency. Thereafter, the reconstructing beam source is put in position to meet the factor $\pi_{RR}'$. Upon image reconstruction, the diffracted image scans focusing plane 4 linearly in an aberration free manner.

With the device of this invention, a scanning width L, the distance $r_a$ from the center of rotation of the disk to the position where the reconstructing beam falls on the disk, and the distance $l_d$ from the hologram disk to the scanning plane are determined, and the optimum positions of the respective beam sources are determined, using the foregoing evaluation functions.

Examples of calculated results are now described with reference to the drawings. The exposure beam source used is a He-Ne laser (wavelength $\lambda = 633$ nm). The reconstruction beam source used is a semiconductor laser (wavelength $\lambda = 780$ nm).

Figure 7:
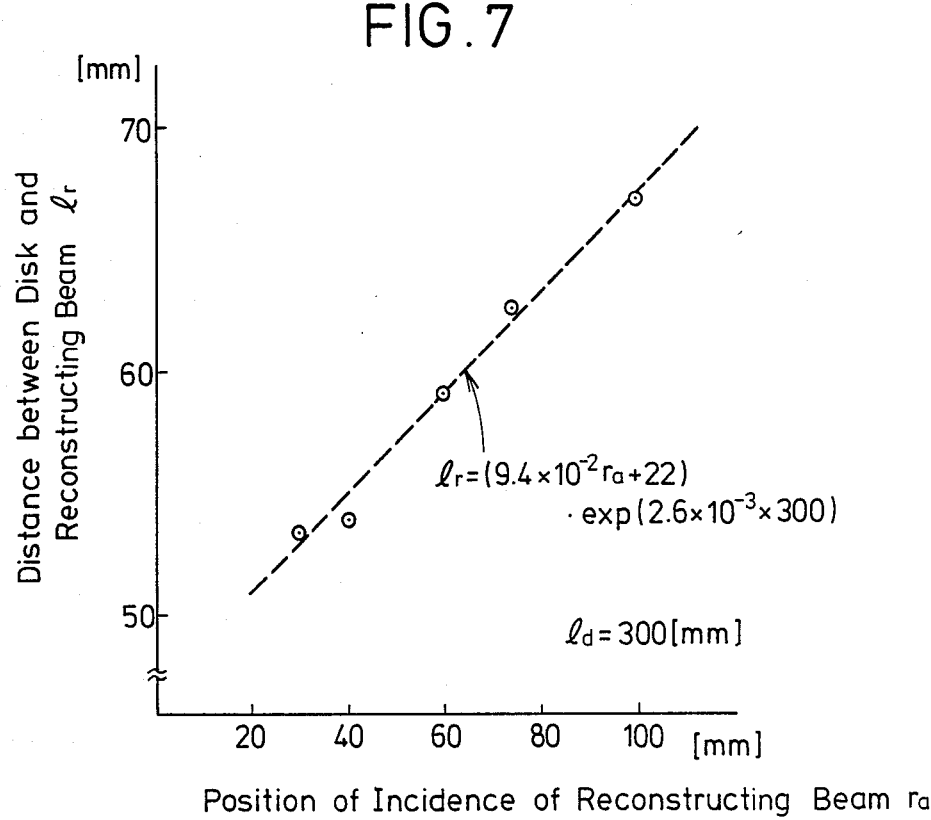

FIG. 7 is a diagram showing optimum values calculated as described above with the vertical axis indicating the distance $l_r$ from the reconstructing beam to the hologram disk and the horizontal axis indicating the distance $r_a$ from the center of rotation of the disk to the position where the reconstruction beam falls on the disk, with the distance $l_d$ from the disk 3 to focusing plane 4 being 300 mm.

Figure 8:
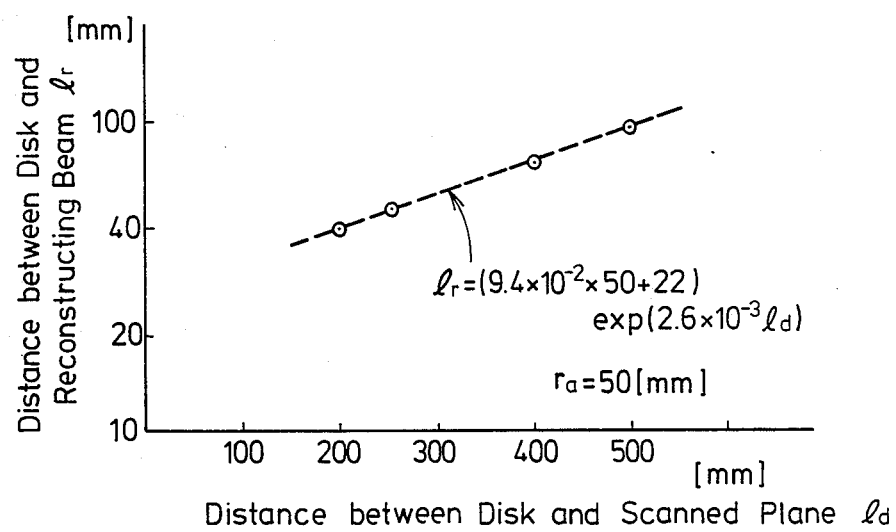

FIG. 8 is a diagram in which optimum values are plotted with $r_a = 50$ mm, $l_r$ on the vertical axis, and $l_d$ on the horizontal axis.

It has been found that if $l_r$ is regarded as a function of $l_d$ and $r_a$ in these diagrams, then the characteristic curves $l_r$ expressed by the broken line can be given by equation (16).

$$l_r = (9.4 \times 10^{-2} r_a + 22) \exp(2.6 \times 10^{-3} l_d) \quad (16)$$

wherein the unit of $l_r$, $r_a$, $l_d$ is mm.

Figure 9:
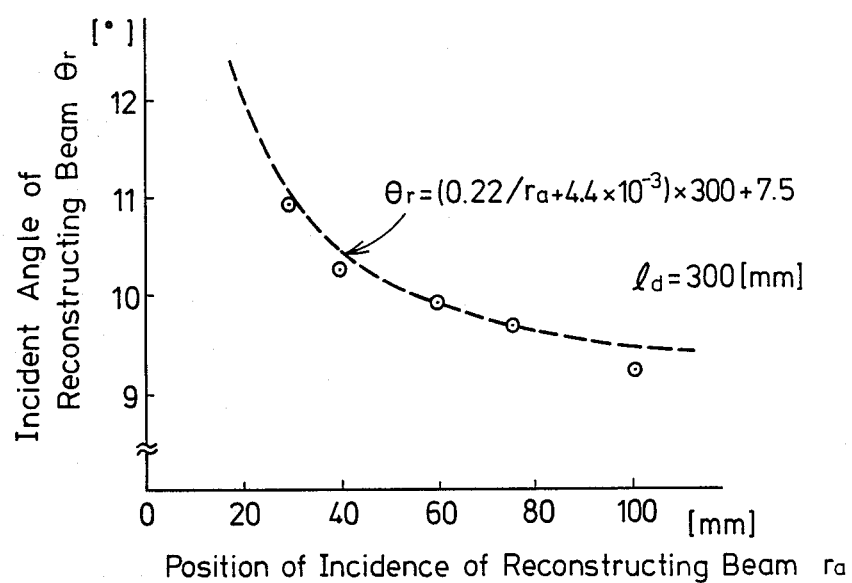
Figure 10:
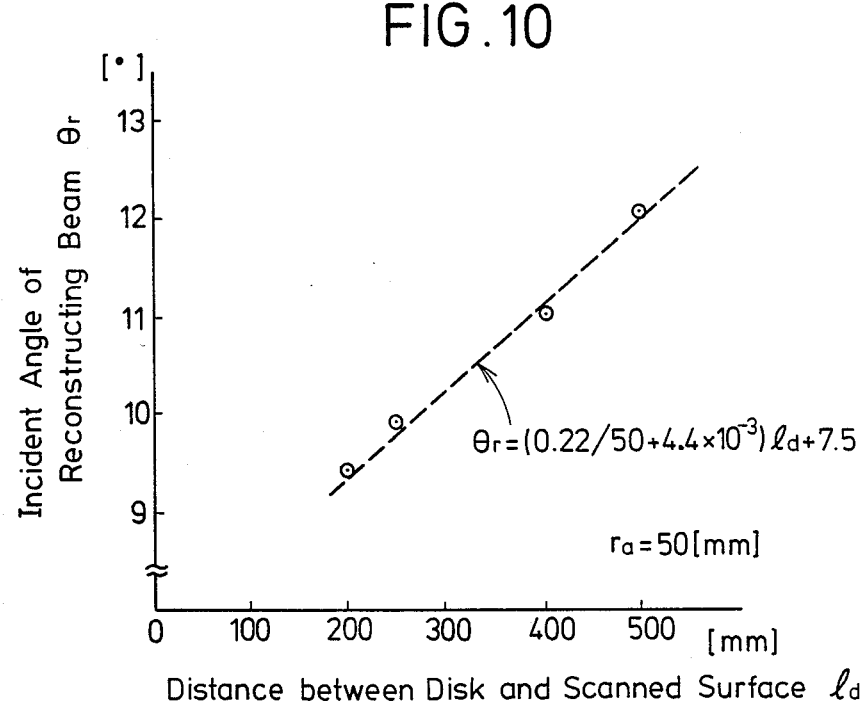

FIGS. 9 and 10 are diagrams plotting optimum values with the vertical axis representing the incident angle $\theta_r$ of the reconstructing beam on the hologram disk and the horizontal axes $r_a$, $l_d$, respectively.

It has been found that if $\theta_r$ is regarded as a function of $l_d$ and $r_a$ in these diagrams, then the characteristic curves $\theta_r$ expressed by the broken line can be given by equation (17).

$$\theta_r = (0.22/r_a + 4.4 \times 10^{-3}) l_d + 7.5 \quad (17)$$

wherein the unit of $\theta_r$ is degree, and the unit of $r_a$, $l_d$ is mm.

Figure 11:
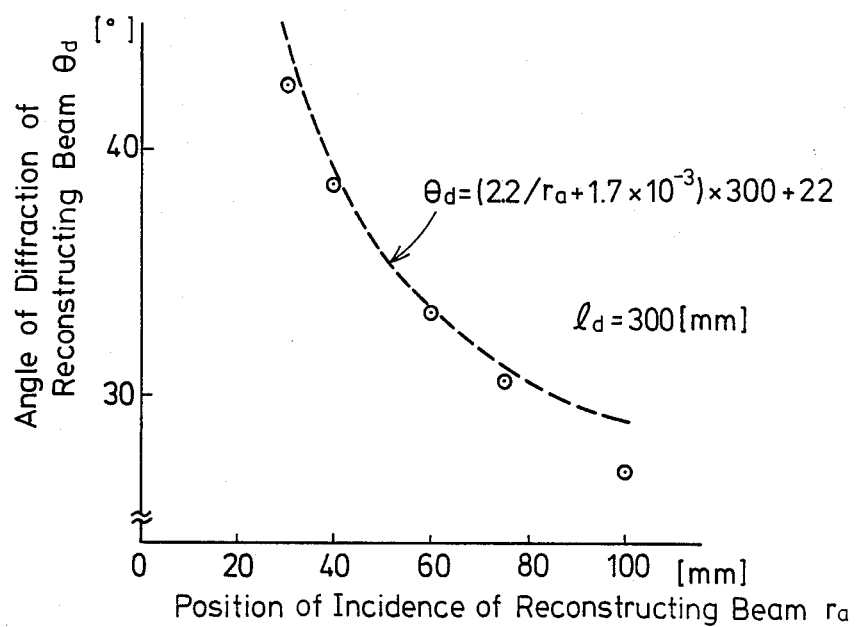
Figure 12:
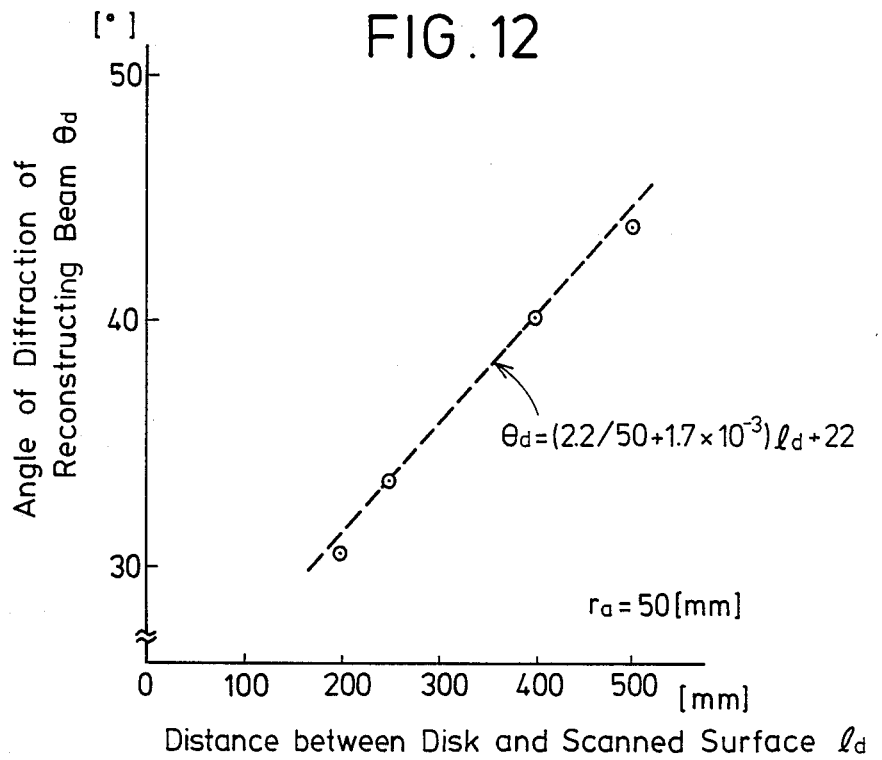

FIGS. 11 and 12 are diagrams plotting optimum values with the vertical axis representing the diffraction angle $\theta d$ of the reconstructing beam and the horizontal axes $r_a$, $l_d$, respectively.

It has been found that if $\theta d$ is regarded as a function of $l_d$ and $r_a$ in these diagrams, then the characteristic curves $\theta_d$ expressed by the broken line can be given by the equation (18).

$$\theta_d = (2.2/r_a + 1.7 \times 10^{-3}) l_d + 22 \quad (18)$$

wherein $\theta_d$ is the diffraction angle at the time the angle of rotation of the hologram disk is an angle at which the diffracted beam scans the center of the scanning line, the unit of $\theta_d$ being degree.

Figure 13:
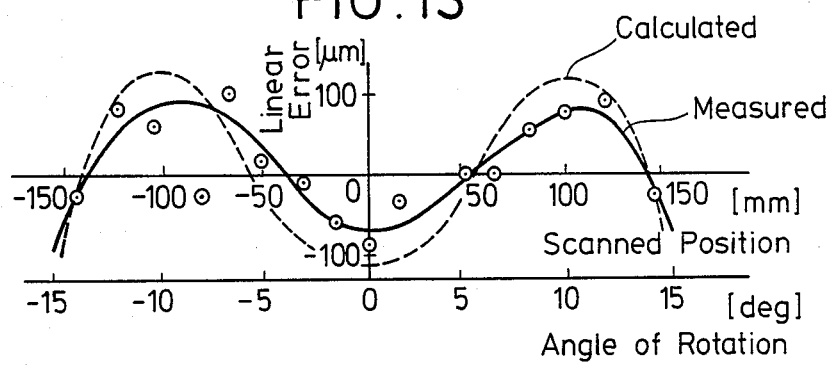
Figure 14:
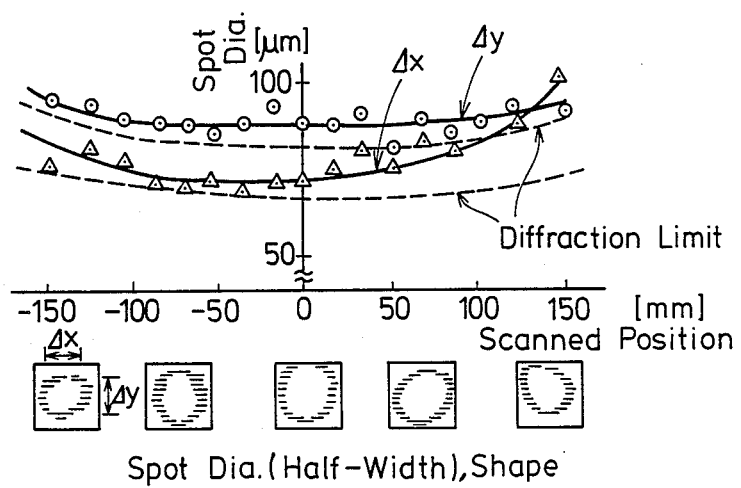
Figure 15:
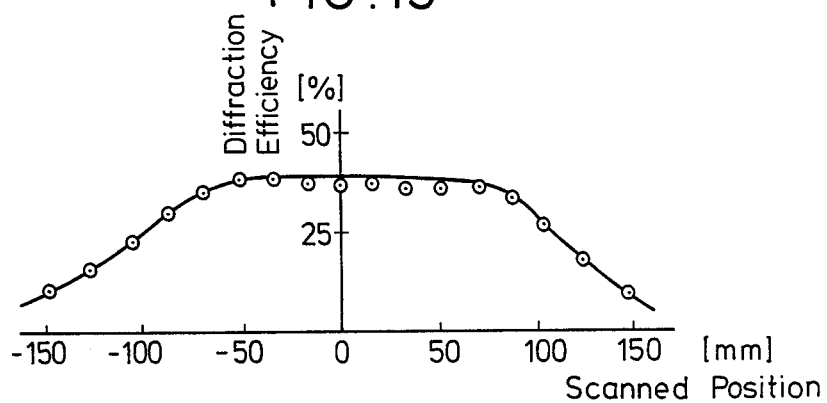

FIGS. 13 through 15 are diagrams showing, respectively, linearity error, convergent spot diameter, and diffraction efficiency of a scanning spot on focusing plane 4 of the illustrative embodiment. In the experiment, a He—Ne laser having a waveform $\lambda_C$ of 0.6328 µm was used as the reference beam source, and a semiconductor laser having a wavelength $\lambda_R$ of 0.78 µm was used as the reconstructing beam source, and a scanning width of $\pm 150$ mm was obtained. In such a range, satisfactory results were obtained, that is, the linearity of $\pm 100$ µm, the maximum spot diameter of 100 µm, and diffraction efficiency of $\phi =$ about 45% (which varies dependent on the condition in which the hologram plate is treated).

The photosensitive material used in the holograms may comprise a photoresist, and after it is exposed and developed, the substrate may be etched by slant ion etching to provide an echelette grating for increased diffraction efficiency. The photoresist may be exposed under the condition which meets equations (1) and (2) only. The substrate may be of a silicon crystal to provide an echelette grating with anisotropic etching. The echelette grating may be used as an original, and a replica of transparent plastic may be formed therefrom.

With the present invention, as described above, there is provided an optical scanning device of a simple construction, which is capable of linear scanning, has a convergent capability free from aberrations, and has high diffraction efficiency. Since the recording beam (e.g. comprising object beam and reference beam) and the reconstructing beam have different wavelengths, a He-Ne laser or argon laser, which is optimum for presently available hologram photosensitive materials, may be used in preparing holograms, and a semiconductor laser may be used in reconstructing recorded images.

The foregoing description is illustrative of the principles of the invention. Numerous modifications and extensions there of would be apparent to the worker skilled in the art. All such extensions and modifications are to be considered to be within the spirit and scope of the invention.

What is claimed is:

1. An optical scanning device comprising a flat transmission or reflection hoogram disk, wherein recording beams comprising an object beam and a reference beam and used in preparing holograms and a reconstructing beam used in reconstructing or scanning are all of diverging or converging spherical waves with said object beam and said reference beam having the same wavelength and said reconstructing beam having a different wavelength; and wherein said optical scanning device comprises beam sources of said recording beams and said reconstructing beam are located at different positions for enabling said recording and reconstructing beams to fall obliquely on said hologram disk to cause a reconstructed image on a focusing or scanning plane to be subjected to linear aberration free scanning; wherein said beam sources of said reference beam, said object beam and said reconstructed beam are positioned in a region wherein said reconstructing beam falls on said hologram disk so as to substantially satisfy the following equations:

$$f_C(\pi_{CO}, \pi_{CR}, r, \theta, \phi, \lambda_C) \approx f_R(\pi_{RO}, \pi_{RR}, r, \theta, \phi, \lambda_R)$$

$$\Phi_C(\pi r_{CO}, \pi r_{CR}, r, \theta, \phi, \lambda_C) \approx \Phi_R(\pi r_{RO}, \pi r_{RR}, r, \theta, \phi, \lambda_R)$$

wherein $f_C$ is the spatial frequency of the interference fringes recorded on the holograms by said object and reference beams; $\Phi_C$ is the inclination of the interference fringes; $f_R$ is the spatial frequency of the interference fringes formed on the holograms by a hypothetical beam converging at one point on the focusing plane and the reconstructing beams; $\Phi_R$ is the inclination of the interference fringes; $\pi r_{CO}$ is a vector indicative of the position of the object beam source; $\pi r_{CR}$ is a vector indicative of the position of the reference beam source; $\pi r_{RO}$ is a vector indicative of the position of the hypothetical beam source; $\pi r_{RR}$ is a vector indicative of the position of the reconstructed beam source; $(r, \theta)$ are coordinates on the hologram disk; $\phi$ is angle of rotation of the hologram disk; $\lambda_C$ is the wavelength of said recording beam; and $\lambda_R$ is the wavelength of said reconstructing and said hypothetical beams; wherein said hologram disk is a transmission hologram disk; wherein said reconstruction beam is of a divergent spherical wave; and wherein the distance between said position of said reconstructing beam source and said hologram substantially satisfies the following equation:

$$l_r = (9.4 \times 10^{-2} r_a + 22) \exp(2.6 \times 10^{-3} l_d)$$

wherein $l_r$ is is the distance between said reconstructing beam source and said hologram disk in mm; $r_a$ is the distance between the center of rotation of said hologram disk and the position wherein said reconstructing beam falls on said hologram disk in mm; and $l_d$ is the distance between said hologram disk and said scanning plane in mm.

2. An optical scanning device comprising a flat transmission or reflection hologram disk, wherein recording beams comprising an object beam and a reference beam and used in preparing holograms and a reconstructing beam used in reconstructing or scanning are all of diverging or converging spherical waves with said object beam and said reference beam having the same wavelength and said reconstructing beam having a different wavelength; and wherein said optical scanning device comprises beam sources of said recording beams and said reconstructing beam are located at different positions for enabling said recording and reconstructing beams to fall obliquely on said hologram disk to cause a reconstructed image on a focusing or scanning plane to be subjected to linear aberration free scanning; wherein said beam sources of said reference beam, said object beam and said reconstructing beam are positioned in a region wherein said reconstructing beam falls on said hologram disk so as to substantially satisfy the following equations:

$$f_C(\pi r_{CO}, \pi r_{CR}, r, \theta, \phi, \lambda_C) \approx f_R(\pi r_{RO}, \pi r_{RR}, r, \theta, \phi, \lambda_R)$$

$$\Phi_C(\pi r_{CR}, \pi r_{CR}, r, \theta, \phi, \lambda_C) \approx \Phi_R(\pi r_{RO}, \pi r_{RR}, r, \theta, \phi, \lambda_R)$$

wherein $f_C$ is the spatial frequency of the interference fringes recorded on the holograms by said object and reference beams; $\Phi_C$ is the inclination of the interference fringes; $f_R$ is the spatial frequency of the interference fringes formed on the holograms by a hypothetical beam converging at one point on the focusing plane and the reconstruction beam; $\Phi_R$ is the inclination of the interference fringes; $\pi r_{CO}$ is a vector indicative of the position of the object beam source; $\pi r_{CR}$ is a vector indicative of the position of the reference beam source; $\pi r_{RO}$ is a vector indicative of the position of the hypothetical beam source; $\pi r_{RR}$ is a vector indicative of the position of the reconstructed beam source; $(r, \theta)$ are coordinates on the hologram disk; $\phi$ is angle of rotation of the hologram disk; $\lambda_C$ is the wavelength of said recording beam; and $\lambda_R$ is the wavelength of said reconstructing and said hypothetical beams; wherein said hologram disk is a transmission hologram disk; wherein said reconstructing beam is of a divergent spherical wave; and wherein the incident angle of said reconstructing beam substantially satisfies the following equation:

$$\theta_r = (0.22/r_a + 4.4 \times 10^{-3}) l_d + 7.5$$

wherein $\theta_r$ is the incident angle of said reconstructing beam in degrees; $r_a$ is the distance between the center of rotation of said hologram disk and the position where said reconstructing beam falls on said hologram disk in mm; and $l_d$ is the distance between said hologram disk and said scanning plane in mm.

3. An optical scanning device comprising a flat transmission or reflection hologram disk, wherein recording beams comprising an object beam and a reference beam and used in preparing holograms and a reconstructing beam used in reconstructing or scanning are all of diverging or converging spherical waves with said object beam and said reference beam having the same wavelength and said reconstructing beam having a different wavelength; and wherein said optical scanning device comprises beam sources of said recording beams and said reconstructing beam are located at different positions for enabling said recording and reconstructing beams to fall obliquely on said hologram disk to cause a reconstructed image on a focusing or scanning plane to be subjected to linear aberration free scanning; wherein said beam sources of said reference beam, said object beam and said reconstructing beam are positioned in a region wherein said reconstructing beam falls on said hologram disk so as to substantially satisfy the following equations:

$$f_C(\pi r_{CO}, \pi r_{CR}, r, \theta, \phi, \lambda_C) \approx f_R(\pi r_{RO}, \pi r_{RR}, r, \theta, \phi, \lambda_R)$$

$$\Phi_C(\pi r_{CO}, \pi r_{CR}, r, \theta, \phi, \lambda_C) \approx \Phi_R(\pi r_{RO}, \pi r_{RR}, r, \theta, \phi, \lambda_R)$$

wherein $f_C$ is the spatial frequency of the interference fringes recorded on the holograms by said object and reference beams, $\phi_C$ is the inclination of the interference fringes; $f_R$ is the spatial frequency of the interference fringes formed on the holograms by a hypothetic beam converging at one point on the focusing plane and the reconstructing beam; $\Phi_R$ is the inclination of the interference fringes; $\pi r_{CO}$ is a vector indicative of the position of the object beam source; $\pi r_{CR}$ is a vector indicative of the position of the reference beam source; $\pi r_{RO}$ is a vector indicative of the position of the hypothetical beam source; $\pi r_{RR}$ is a vector indicative of the position of the reconstructed beam source; $(r, \theta)$ are coordinates on the hologram disk; $\phi$ is angle of rotation of the hologram disk; $\lambda_C$ is the wavelength of said recording beam; and $\lambda_R$ is the wavelength of said reconstructing and said hypothetical beams; wherein said hologram disk is a transmission hologram disk; wherein said reconstructing beam is of a divergent spherical wave; and wherein the incident angle of said reconstructing beam substantially satisfies the following equation when the angle of rotation of said hologram disk is the angle at which the diffracted beam scans the center of a scanning line:

$$\theta_d = (2.2/r_a + 1.7 \times 10^{-3})l_d + 22$$

wherein $\theta_d$ is the diffraction angle at the time the angle of rotation of said hologram disk is the angle at which the diffracted beam scans the center of said scanning line in degrees; $r_a$ is the distance between the center of rotation of said hologram disk and the position where said reconstructed beam falls on said hologram disk in mm; and $l_d$ is the distance between said hologram disk and said scanning plane in mm.

* * * * *